US012715514B2

(12) United States Patent
Nagashima et al.

(10) Patent No.: US 12,715,514 B2
(45) Date of Patent: Aug. 25, 2026

(54) VEHICLE SKELETON STRUCTURE

(71) Applicant: TOYOTA JIDOSHA KABUSHIKI KAISHA, Toyota (JP)

(72) Inventors: Shinya Nagashima, Kariya (JP); Toshiyuki Dobashi, Nagoya (JP); Nobuyuki Shinohara, Tajimi (JP); Mayumi Takazawa, Okazaki (JP); Reona Takagishi, Tajimi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 284 days.

(21) Appl. No.: 18/544,431

(22) Filed: Dec. 19, 2023

(65) Prior Publication Data

US 2024/0278841 A1 Aug. 22, 2024

(30) Foreign Application Priority Data

Feb. 17, 2023 (JP) ................................ 2023-023754

(51) Int. Cl.
*B62D 21/15* (2006.01)
*B62D 25/20* (2006.01)
*B62D 29/00* (2006.01)

(52) U.S. Cl.
CPC ....... *B62D 21/152* (2013.01); *B62D 25/2027* (2013.01); *B62D 25/2036* (2013.01); *B62D 29/008* (2013.01)

(58) Field of Classification Search
CPC .......................... B62D 29/008; B62D 25/2027
See application file for complete search history.

(56) References Cited

U.S. PATENT DOCUMENTS 4,684,151 A * 8/1987 Drewek ............... B62D 21/152 296/187.03
4,702,515 A * 10/1987 Kato .................... B62D 21/152 296/187.03
5,246,263 A * 9/1993 Tanaka ................ B62D 25/087 296/187.11
5,431,445 A * 7/1995 Wheatley ............ B62D 21/152 296/187.03
6,554,176 B2 * 4/2003 McGill ................ B23K 26/262 228/112.1

(Continued)

FOREIGN PATENT DOCUMENTS

JP S55-147971 U 10/1980
JP 2002-070908 A 3/2002

(Continued)

*Primary Examiner* — Robert E Fuller

(74) *Attorney, Agent, or Firm* — SOLARIS Intellectual Property Group, PLLC

(57) ABSTRACT

A vehicle skeleton structure, including: a die-cast skeleton body formed integrally and including a floor part configuring a vehicle cabin floor portion and a side member extending from the floor part towards a vehicle front or a vehicle rear; a transverse concave bead, the transverse concave bead being formed at a leading end side of the side member in the skeleton body, and the transverse concave bead extending in at least one of a vehicle width direction or a vehicle vertical direction; and a longitudinal concave bead, the longitudinal concave bead being formed at a base end side of the side member in the skeleton body, and the longitudinal concave bead extending in a vehicle front-rear direction.

6 Claims, 4 Drawing Sheets

(56) References Cited

U.S. PATENT DOCUMENTS

| | | | | |
|---|---|---|---|---|
| 9,834,160 | B2 * | 12/2017 | Staines | B60R 19/34 |
| 2004/0119321 | A1 | 6/2004 | Kasuga | |
| 2007/0251751 | A1 * | 11/2007 | Ball | B62D 21/02 180/312 |
| 2018/0362087 | A1 | 12/2018 | Kodama et al. | |
| 2023/0373563 | A1 * | 11/2023 | Rai | B62D 21/152 |

FOREIGN PATENT DOCUMENTS

| | | | |
|---|---|---|---|
| JP | 2004-182189 | A | 7/2004 |
| JP | 2009-073226 | A | 4/2009 |
| JP | 2009-234377 | A | 10/2009 |
| JP | 2010-006233 | A | 1/2010 |
| JP | 2016-113082 | A | 6/2016 |
| WO | 2022/031991 | A1 | 2/2022 |

* cited by examiner

VEHICLE SKELETON STRUCTURE

CROSS-REFERENCE TO RELATED APPLICATION

This application is based on and claims priority under 35 USC 119 from Japanese Patent Application No. 2023-023754, filed on Feb. 17, 2023, the disclosure of which is incorporated by reference herein.

BACKGROUND

Technical Field

The present disclosure relates to a vehicle skeleton structure.

Related Art

International Publication (WO) No. 2022/031991 discloses a vehicle having an energy absorbing structure made by die casting. The energy absorbing structure includes plural ribs arranged in a front-rear direction of the vehicle, and corrugations provided between the ribs.

However, there is room for improvement of the vehicle described in WO No. 2022/031991 from the standpoint of deformation of the vehicle according to a desired deformation mode during a collision.

SUMMARY

An object of the present disclosure is to obtain a vehicle skeleton structure that can be deformed in a desired deformation mode when a vehicle collides.

A vehicle skeleton structure of a first aspect of the present disclosure includes: a die-cast skeleton body formed integrally including a floor part configuring a vehicle cabin floor portion and a side member extending from the floor part towards a vehicle front or a vehicle rear; a transverse concave bead formed at a leading end side of the side member in the skeleton body, and extending in at least one of a vehicle width direction or a vehicle vertical direction; and a longitudinal concave bead formed at a base end side of the side member in the skeleton body, and extending in a vehicle front-rear direction.

In the vehicle skeleton structure of the first aspect of the present disclosure, a die-cast skeleton body is integrally formed including a floor part and a side member. Further, a transverse concave bead is formed at a leading end side of the side member in the skeleton body. Here, the transverse concave bead extends in at least one of the vehicle width direction or the vehicle vertical direction. As a result, when a collision load is input to the side member during a vehicle collision, the leading end side of the side member collapses from the transverse concave bead as a starting point, and energy is absorbed.

A longitudinal concave bead extending in a front-rear direction of the vehicle is formed at a base end side of the side member. As a result, the base end side of the side member is less likely to collapse in the front-rear direction as a result of the longitudinal concave bead, thereby suppressing entry of the barrier as far as the floor part.

A vehicle skeleton structure of a second aspect of the present disclosure is the first aspect, in which the side member is configured by an upper wall positioned at a vehicle upper side, a lower wall positioned at a vehicle lower side, and a left and right pair of side walls linking the upper wall and the lower wall, and the transverse concave bead is formed at at least two wall faces among the upper wall, the lower wall and the side walls.

In the vehicle skeleton structure of the second aspect of the present disclosure, the transverse concave bead is formed at at least two wall faces from among the upper wall, the lower wall, and the side walls of the side member. This enables the leading end side of the side member to effectively collapse and absorb energy.

A vehicle skeleton structure of a third aspect of the present disclosure is the second aspect, in which the transverse concave bead is formed at the side wall at an outer side in the vehicle width direction at the base end side of the side member.

In the vehicle skeleton structure of the third aspect of the present disclosure, a transverse concave bead is formed on the side wall at the outer side in the vehicle width direction at a base end side of the side member. As a result, when an excessive collision load is input to the base end side of the side member, the deformation mode becomes such that the side member is bent outward in the vehicle width direction from the transverse concave bead as a starting point. This enables the space between the pair of side members to be protected.

A vehicle skeleton structure of a fourth aspect of the present disclosure is the second or third aspect, in which the longitudinal concave bead is formed at the side wall at an inner side in the vehicle width direction at the base end side of the side member.

In the vehicle skeleton structure of the fourth aspect of the present disclosure, the longitudinal concave bead is formed on the side wall at an inner side in the vehicle width direction at the base end side of the side member. As a result, when an excessive collision load is input to the base end side of the side member, the inner side at which the longitudinal concave bead is formed is less likely to break, which results in a deformation mode in which the side member is bent outward in the vehicle width direction. As a result, the space between the pair of side members can be protected.

A vehicle skeleton structure of a fifth aspect of the present disclosure is the first aspect, in which the floor part configures a floor portion at a rear part of a vehicle cabin, and the side member comprises a rear side member extending from the floor part towards a vehicle rear side.

In the vehicle skeleton structure of the fifth aspect of the present disclosure, particularly during a rear collision of the vehicle, the rear side member can be deformed in a desired deformation mode, and the barrier can be inhibited from entering the rear floor at the rear of the vehicle cabin.

As described above, the vehicle skeleton structure according to the present disclosure enables the vehicle to be deformed in a desired deformation mode at a time of vehicle collision.

BRIEF DESCRIPTION OF THE DRAWINGS

Exemplary embodiments of the present disclosure will be described in detail based on the following figures, wherein.

DETAILED DESCRIPTION

Figure 1:
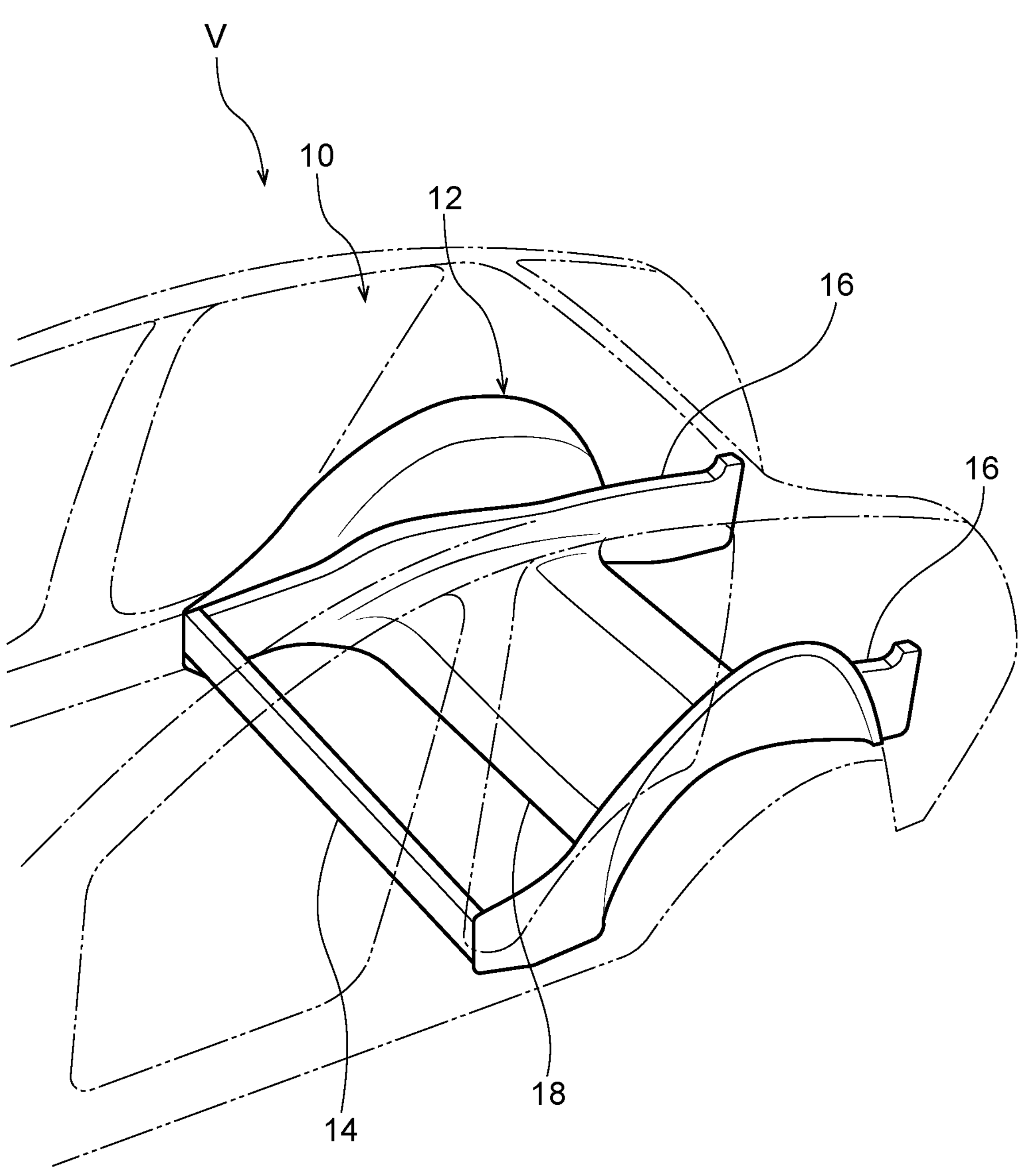
FIG. 1 is a perspective view illustrating a main part of a vehicle to which a vehicle skeleton structure according to an exemplary embodiment has been applied.

Explanation follows regarding a vehicle skeleton structure 10 according to an exemplary embodiment, with reference to the drawings. Note that the arrow UP, the arrow RR, and the arrow RH illustrated as appropriate in the drawings respectively indicate an upward direction in a vehicle vertical direction, a rearward direction in a vehicle front-rear direction, and a rightward direction facing a travel direction. In the case of explanation using only the front-rear, upward/downward, and left/right directions, unless otherwise specified, these indicate forward and rearward in the vehicle front-rear direction, upward and downward in the vehicle vertical direction, and left and right in a vehicle width direction.

FIG. 1 is a perspective view illustrating a main part of a vehicle V to which a vehicle skeleton structure 10 according to an exemplary embodiment is applied. As illustrated in FIG. 1, a vehicle skeleton structure 10 of the present exemplary embodiment is disposed at a rear part of a vehicle V, and includes a die-cast skeleton body 12.

The skeleton body 12 is configured including a floor part 14 configuring a floor portion of a vehicle cabin rear part, and a rear side member 16 extending toward a vehicle rear side from the floor part 14. Moreover, in the skeleton body 12 of the present exemplary embodiment, the floor part 14 and the rear side member 16 are integrally formed by die casting.

Figure 2:
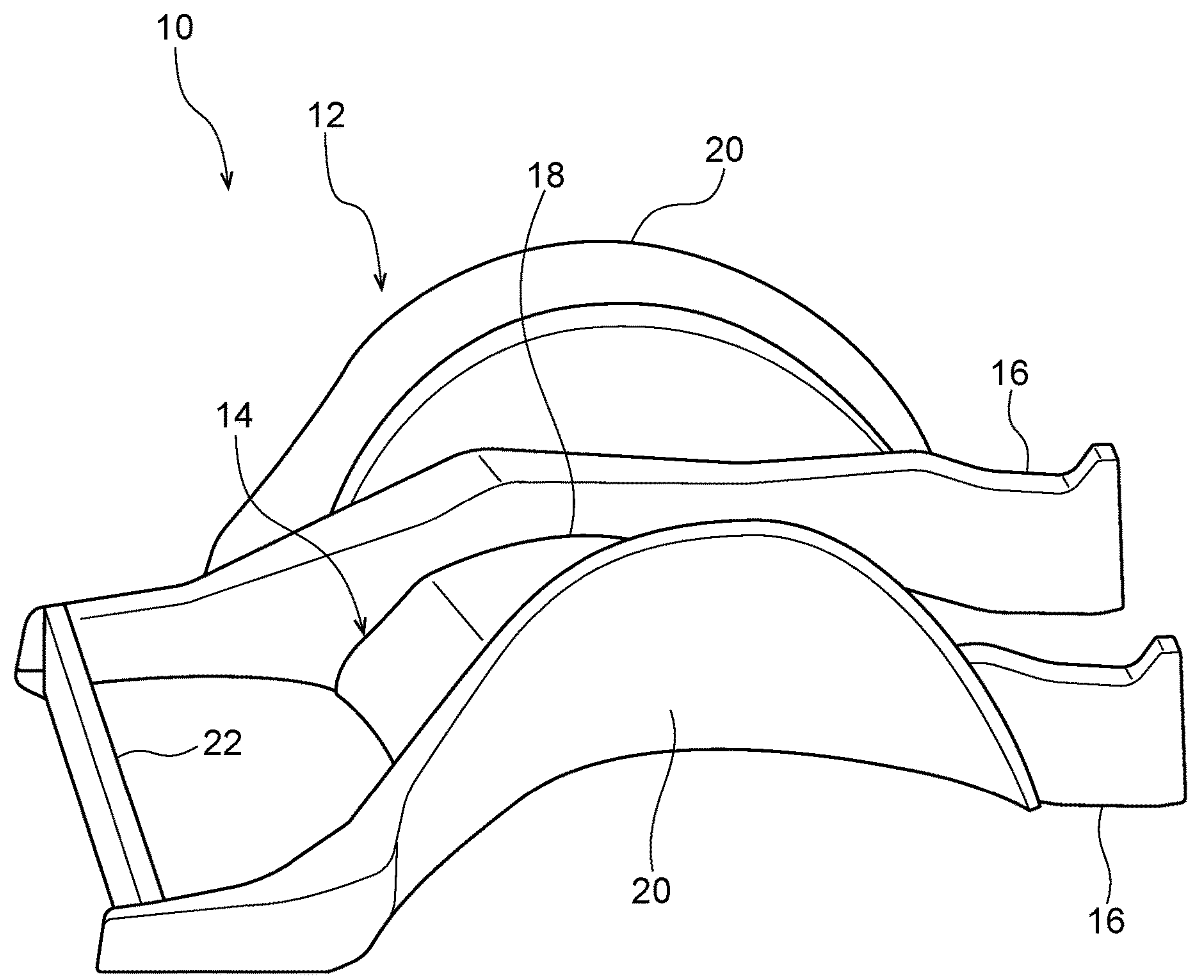
FIG. 2 is a perspective view illustrating a vehicle skeleton structure according to an exemplary embodiment.

FIG. 2 is a perspective view illustrating a vehicle skeleton structure according to an exemplary embodiment. As illustrated in FIG. 2, the floor part 14 includes a floor base 18 that extends in a vehicle front-rear direction and a vehicle width direction. A wheel house 20 is provided at both left and right side end parts of the floor base 18.

The rear side members 16 are provided in a left and right pair, each extending in a front-rear direction from a front end to a rear end of the skeleton body 12. The front end parts of the rear side members 16 are connected by a connecting part 22 extending in the vehicle width direction. Accordingly, a front part of the skeleton body 12 is formed in a substantial frame shape by the floor base 18, the rear side member 16, and the connecting part 22.

A non-illustrated bumper reinforcement is attached to a rear end part of the rear side members 16.

Figure 3:
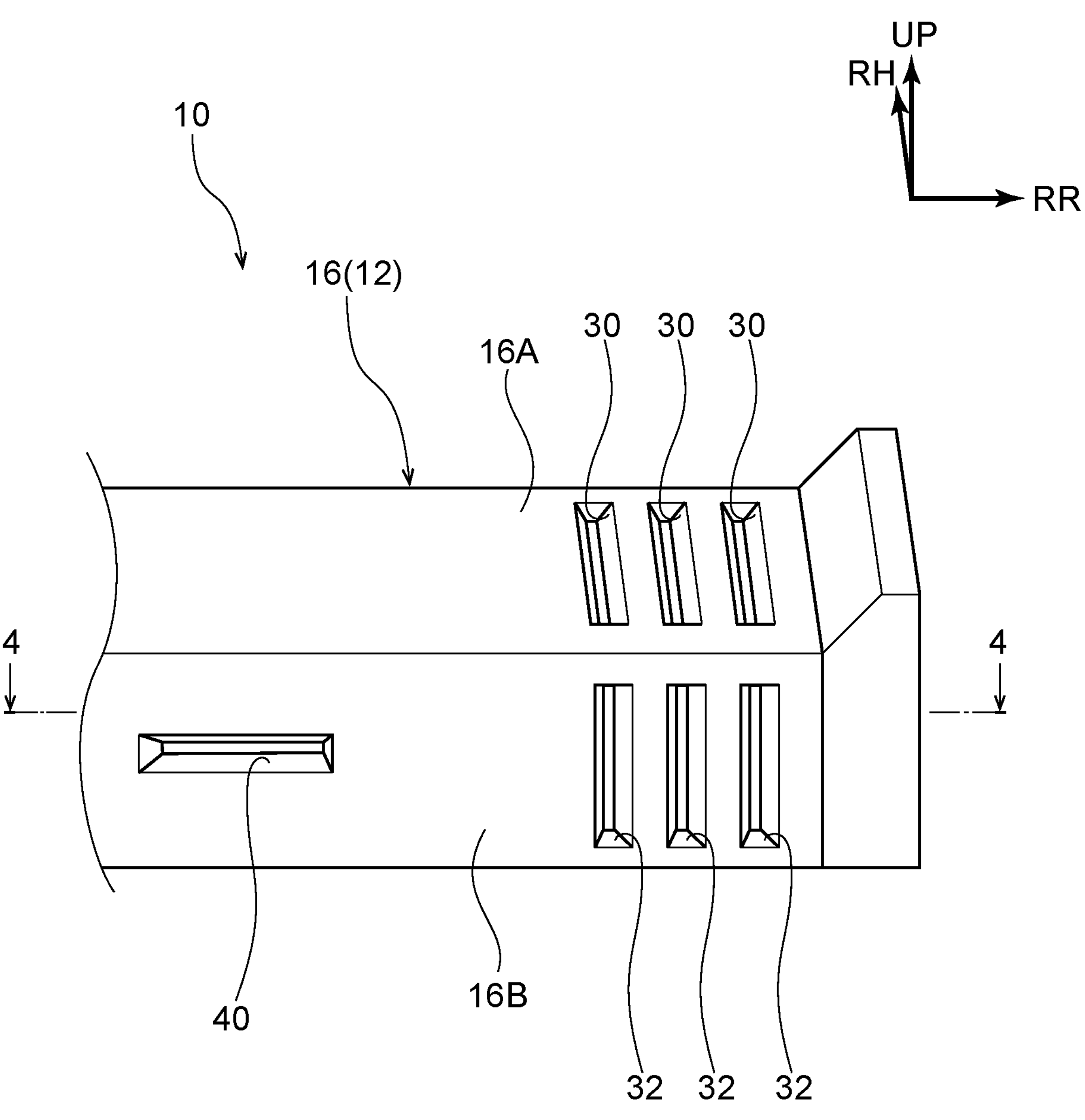
FIG. 3 is an enlarged perspective view of a main part illustrating an enlarged view of a main part of a rear side member in an exemplary embodiment.

FIG. 3 is an enlarged side view of a main part illustrating an enlarged rear part of the rear side member 16 of the exemplary embodiment, and illustrating the rear side member 16 on the right side of the vehicle. As illustrated in FIG. 3, the rear side member 16 is configured including an upper wall 16A situated at a vehicle upper side, a lower wall (not illustrated) situated at a vehicle lower side, and a pair of right and left side walls 16B connecting the upper wall 16A and the lower wall. Note that FIG. 3 illustrates only the left side (the inner side in the vehicle width direction) of the pair of side walls 16B, and the right side wall (the outer side in the vehicle width direction) is hidden from view, but is configured similarly to the left side wall 16B.

Note that plural transverse concave beads 30, 32 are formed at a rear end part (leading end side) of the rear side member 16. The transverse concave beads 30 are formed plurally on the upper wall 16A of the rear side member 16, each extending in the vehicle width direction. The transverse concave beads 30 are formed at intervals in the front-rear direction of the vehicle, and as an example, in the present exemplary embodiment, three transverse concave beads 30 are formed at equal intervals in the front-rear direction of the vehicle. Although the three transverse concave beads 30 have the same shape in the present exemplary embodiment, there is no limitation thereto, and the transverse concave beads 30 may be formed with differing sizes. Further the number of transverse concave beads 30 is not limited.

The transverse concave beads 32 are formed plurally on the side wall 16B at the inner side, in the vehicle width direction, of the rear side member 16, and each extend in the vehicle vertical direction. The transverse concave beads 32 are formed at intervals in the front-rear direction of the vehicle, and as an example, in the present exemplary embodiment, three transverse concave beads 32 are formed at equal intervals in the front-rear direction of the vehicle. Although the three transverse concave beads 32 have the same shape in the present exemplary embodiment, there is no limitation thereto, and the transverse concave beads 32 may be formed with different sizes.

In the present exemplary embodiment, as an example, the transverse concave beads 30 formed on the upper wall 16A and the transverse concave beads 32 formed on the side wall 16B are formed at the same position in the front-rear direction of the vehicle; however, there is no limitation thereto, and they may be formed at different positions.

Figure 4:
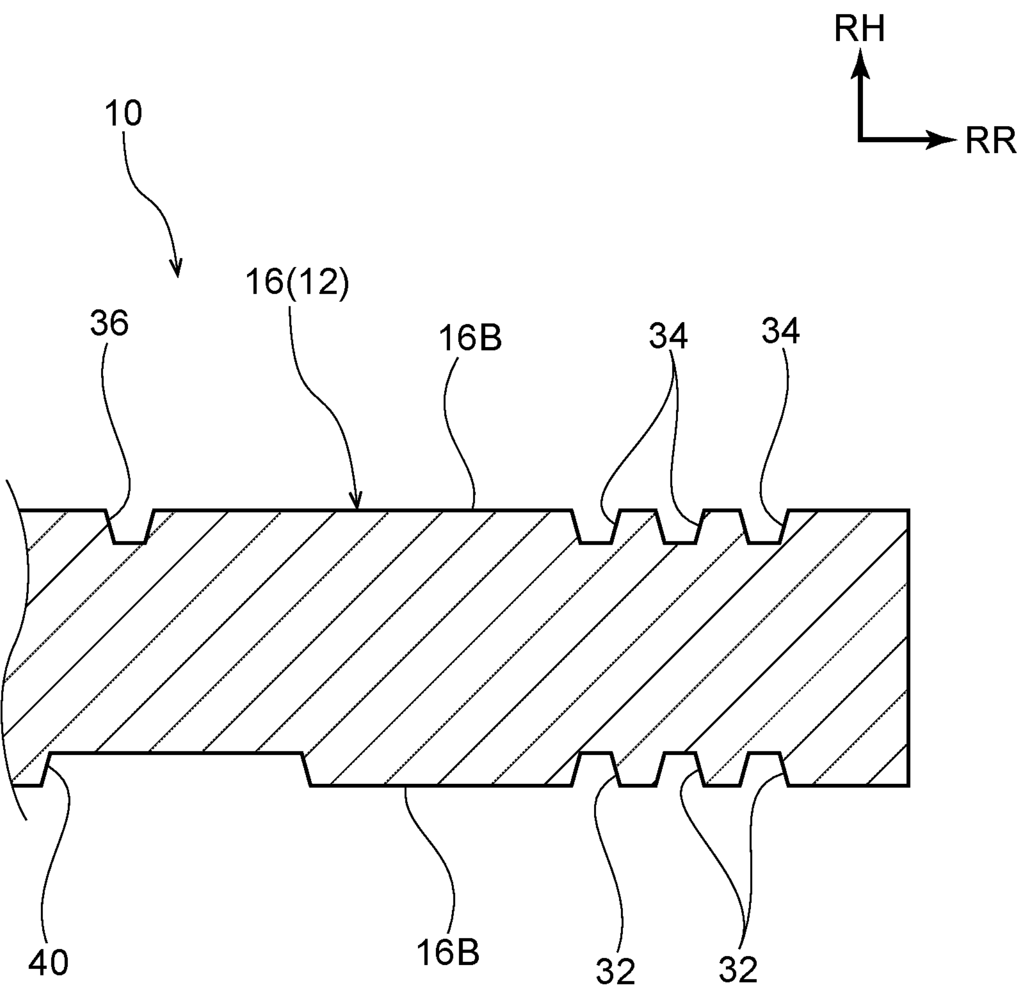
FIG. 4 is an enlarged cross-sectional view of a main part showing a state cut along line 4-4 of FIG. 3.

FIG. 4 is an enlarged cross-sectional view of a main part showing a state cut along line 4-4 of FIG. 3. As illustrated in FIG. 4, transverse concave beads 34 are formed on the outer side wall 16B of the rear side member 16 in the vehicle width direction. The transverse concave beads 34 are formed at intervals in the front-rear direction of the vehicle, and extend in the vertical direction of the vehicle. As an example, in the present exemplary embodiment, three transverse concave beads 34 are formed at equal intervals in the front-rear direction of the vehicle. Although the three transverse concave beads 34 have the same shape in the present exemplary embodiment, there is no limitation thereto, and the transverse concave beads 34 may be formed with different sizes.

In the present exemplary embodiment, as an example, the transverse concave bead 32 formed on the left side wall 16B and the transverse concave bead 34 formed on the right side wall 16B are formed at the same position in the front-rear direction of the vehicle; however, there is no limitation thereto, and they may be formed at different positions.

As illustrated in FIG. 3 and FIG. 4, a longitudinal concave bead 40 extending in the vehicle front-rear direction is formed at a base end side of the rear side member 16 of the skeleton body 12. Specifically, the longitudinal concave bead 40 is formed closer to the base end side of the rear side member 16 than the transverse concave beads 30, 32, 34.

Moreover, as an example, in the present exemplary embodiment, the longitudinal concave bead 40 is formed at a central part in the vertical direction of the left side wall 16B of the rear side member 16, and the depth of the longitudinal concave bead 40 is formed to be approximately the same depth as the transverse concave beads 30, 32, 34.

As illustrated in FIG. 4, a transverse concave bead 36 is formed on a side wall 16B at the outer side in the vehicle width direction at the base end side of the rear side member 16. The transverse concave bead 36 is formed at a position overlapping with the longitudinal concave bead 40 when viewed from the vehicle width direction, and extends in the vehicle vertical direction.

The transverse concave bead 36 is formed in a similar shape to the transverse concave beads 30, 32, 34 formed at the leading end side of the rear side member 16.

Although not illustrated in the drawings, the rear side member 16 on the left side of the vehicle is configured to be bilaterally symmetrical to the rear side member 16 on the right side of the vehicle. Namely, on the upper wall of the rear side member 16 on the left side of the vehicle, transverse concave beads of the same shape are formed at a position corresponding to the transverse concave beads 30. Further, transverse concave beads of the same shape are formed at a position corresponding to the transverse concave beads 32 on a side wall of the rear side member 16 on the left side of the vehicle, at an inner side in the vehicle width direction. Moreover, transverse concave beads of the same shape are formed at a position corresponding to the transverse concave beads 34 on a side wall at an outer side in the vehicle width direction of the rear side member 16 on the left side of the vehicle.

A longitudinal concave bead of the same shape is formed at a position corresponding to the longitudinal concave bead 40 on a side wall at an inner side in the vehicle width direction of the rear side member 16 on the left side of the vehicle. A transverse concave bead having the same shape is formed at a position corresponding to the transverse concave bead 36 on a side wall of the rear side member 16 on the left side of the vehicle at the outer side in the vehicle width direction.

(Mechanism)

Next, explanation follows regarding the mechanism of the present exemplary embodiment.

In the vehicle skeleton structure 10 according to the present exemplary embodiment, transverse concave beads 30, 32, 34 are formed at a leading end side of the rear side member 16 of a die-cast skeleton body 12 that is integrally formed including the floor part 14 and the rear side member 16. The transverse concave beads 30 extend in the vehicle width direction, and the transverse concave beads 32, 34 extend in the vehicle vertical direction. As a result, when a collision load is input to the rear side member 16 during a collision of the vehicle V, the leading end side of the rear side member 16 collapses from the transverse concave beads 30, 32, 34 as a starting point, and energy is absorbed.

In particular, in the present exemplary embodiment, the transverse concave beads 30, 32, 34 are formed on plural wall surfaces among the upper wall 16A, the lower wall, and the side walls 16B of the rear side member 16. This enables the leading end side of the rear side member 16 to be effectively collapsed to absorb energy.

A longitudinal concave bead 40 is formed on a side wall 16B at an inner side in the vehicle width direction at a base end side of the rear side member 16. This enables the side wall 16B at the inner side in the vehicle width direction to be less likely to collapse at the base end side of the rear side member 16 as a result of the longitudinal concave bead 40, thereby suppressing entry of the barrier up to the floor part 14.

In particular, in the present exemplary embodiment, since the longitudinal concave bead 40 is formed on the side wall 16B at the inner side in the vehicle width direction, when an excessive collision load is input to the leading end side of the rear side member 16, the rear side member 16 assumes a deformation mode in which the rear side member 16 is bent outward in the vehicle width direction. This enables the space between the pair of rear side members 16 to be protected.

Moreover, in the present exemplary embodiment, a transverse concave bead 36 is formed on the side wall 16B at the outer side in the vehicle width direction at the base end side of the rear side member 16. This enables the side wall 16B at the outer side in the vehicle width direction to easily collapse, as a result of the transverse concave bead 36, at the base end side of the rear side member 16. This enables the rear side member 16 to be effectively folded outward. Namely, when the vehicle V collides, the vehicle V can be deformed in a desired deformation mode.

Moreover, in the present exemplary embodiment, the transverse concave bead 36 is formed forward of the rear end of the longitudinal concave bead 40. For this reason, in cases in which the collision load during a collision of the vehicle Vis relatively small, since the function of the longitudinal concave bead 40 causes the collision load to be dispersed in the forward and rearward directions of the vehicle, the base end side of the rear side member 16 can be inhibited from collapsing. On the other hand, in cases in which the collision load is relatively large, the transverse concave bead 36 collapses, causing the rear side member 16 to fold outward.

In particular, in the present exemplary embodiment, since the rear side member 16 can be deformed in a desired deformation mode during a rear surface collision of the vehicle V, the barrier can be inhibited from entering the rear floor at the rear of the vehicle cabin.

Although explanation has been given regarding the vehicle skeleton structure 10 according to the exemplary embodiment, it will be apparent that various embodiments may be implemented within a range not departing from the gist of the present disclosure. Although in the above exemplary embodiment, one longitudinal concave bead 40 is formed at the side wall 16B of the rear side member 16 at the inner side in the vehicle width direction, there is no limitation thereto. For example, plural longitudinal concave beads 40 may be formed, and the longitudinal concave beads 40 may be formed on plural wall surfaces among the upper wall 16A, the lower wall, and the side walls 16B.

Although the transverse concave bead 36 is formed in the side wall 16B at the outer side in the vehicle width direction at the base end side of the rear side member 16 in the above exemplary embodiment, there is no limitation thereto, and alternatively, the structure may be such that the transverse concave bead 36 is not provided. Even in a structure not including the transverse concave bead 36, the sidewall 16B at the inner side in the vehicle width direction, at which the longitudinal concave bead 40 is formed, is less likely to break, enabling the rear side member 16 to be folded outward.

Moreover, although in the above exemplary embodiment, the transverse concave bead 30 is formed on the upper wall 16A of the rear side member 16, and the transverse concave bead 32 is formed on the left and right side walls 16B of the rear side member 16, there is no limitation thereto. For example, the transverse concave beads may be formed on only one or both of the side walls 16B. Alternatively, for example, a structure in which a transverse concave bead is formed only on the upper wall 16A or a structure in which a transverse concave bead is formed only on the lower wall may be adopted. Alternatively, a structure in which transverse concave beads are formed on all four wall surfaces of the upper wall 16A, the lower wall, and both side walls 16B may be adopted.

Moreover, although explanation has been given regarding a structure in which the vehicle skeleton structure 10 is disposed at a rear part of the vehicle in the above exemplary embodiment, there is no limitation thereto. For example, a similar vehicle skeleton structure may be applied to a front part of the vehicle V. In this case, the skeleton body 12 may adopt an integrally formed structure including a front side member and a front floor. Further, transverse concave beads similar to the transverse concave beads 30, 32, 34 may be formed at a front end part of the front side member.

What is claimed is:

1. A vehicle skeleton structure, comprising:

a die-cast skeleton body formed integrally and including a floor part configuring a vehicle cabin floor portion and a side member extending from the floor part towards a vehicle rear;

a first transverse concave bead, the first transverse concave bead being formed at a rear end side of the side member in the skeleton body, and the first transverse concave bead extending in at least one of a vehicle width direction or a vehicle vertical direction; and a longitudinal concave bead, the longitudinal concave bead being formed at the side member in the skeleton body at a position forward of the first transverse concave bead in a vehicle front-rear direction, and the longitudinal concave bead extending in the vehicle front-rear direction.

2. The vehicle skeleton structure of claim 1, wherein:

the side member is configured by an upper wall positioned at a vehicle upper side, a lower wall positioned at a vehicle lower side, and a left and right pair of side walls linking the upper wall and the lower wall, and the first transverse concave bead is formed at at least two wall faces among the upper wall, the lower wall and the side walls.

3. The vehicle skeleton structure of claim 2, further comprising a second transverse concave bead, the second transverse concave bead being formed at the side wall at an outer side in the vehicle width direction at a position forward of the first transverse concave bead in the vehicle front-rear direction, and the second transverse concave bead extending in the vehicle vertical direction.

4. The vehicle skeleton structure of claim 2, wherein the longitudinal concave bead is formed at the side wall at an inner side in the vehicle width direction.

5. The vehicle skeleton structure of claim 1, wherein:

the floor part configures a floor portion at a rear part of a vehicle cabin, and the side member comprises a rear side member extending from the floor part towards a vehicle rear side.

6. A vehicle skeleton structure, comprising:

a die-cast skeleton body formed integrally and including a floor part configuring a vehicle cabin floor portion and a side member extending from the floor part towards a vehicle front;

a first transverse concave bead, the first transverse concave bead being formed at a front end side of the side member in the skeleton body, and the first transverse concave bead extending in at least one of a vehicle width direction or a vehicle vertical direction; and a longitudinal concave bead, the longitudinal concave bead being formed at the side member in the skeleton body at a position rearward of the first transverse concave bead in a vehicle front-rear direction, and the longitudinal concave bead extending in the vehicle front-rear direction.

* * * * *